Aug. 23, 1966   E. E. ROSS ET AL   3,268,057
TAPERED AGRICULTURAL PRODUCT ORIENTING APPARATUS AND METHOD
Filed Sept. 10, 1963   4 Sheets-Sheet 3
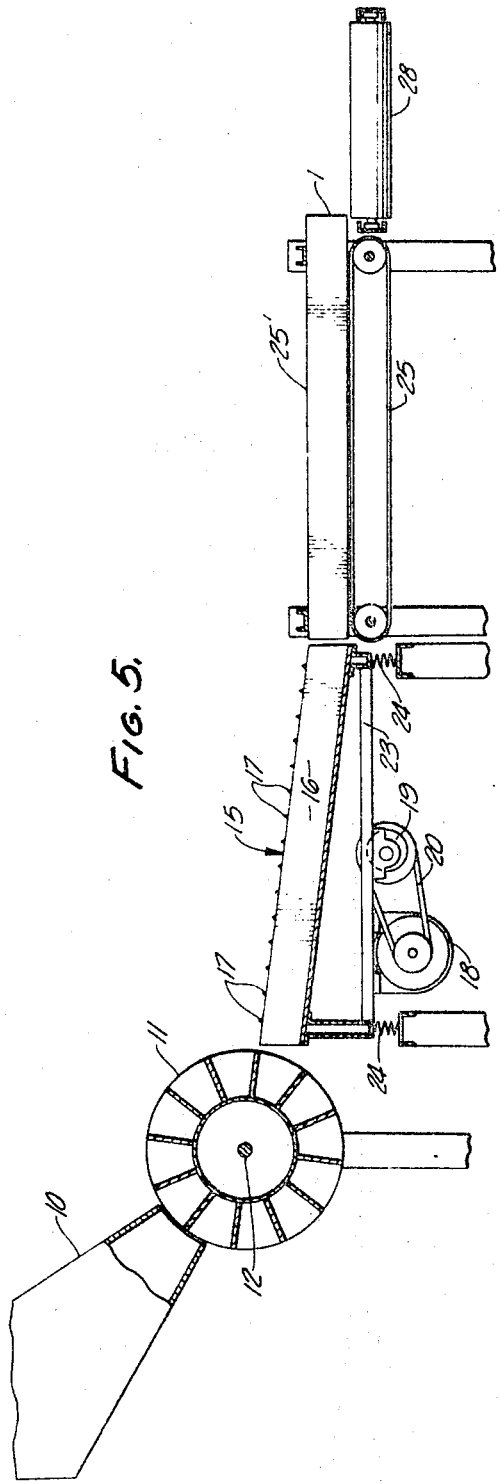
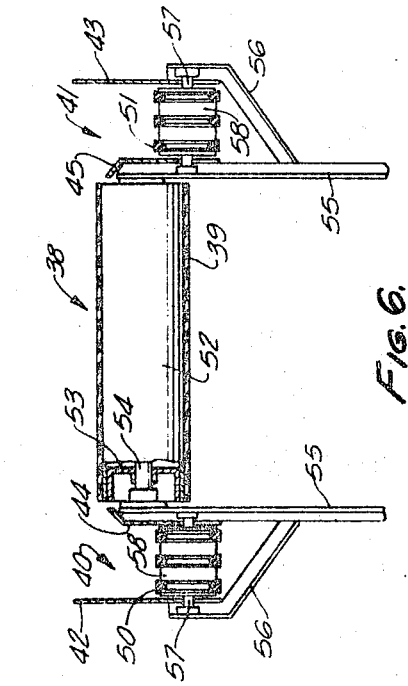
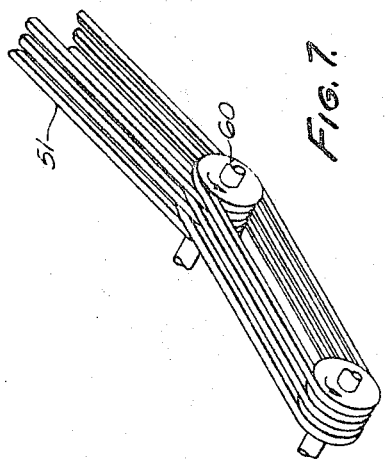
EDWARD E. ROSS
JACK CUNNINGHAM
FRED HARTMAN
INVENTORS.
BY *Lyon & Lyon*
ATTORNEYS

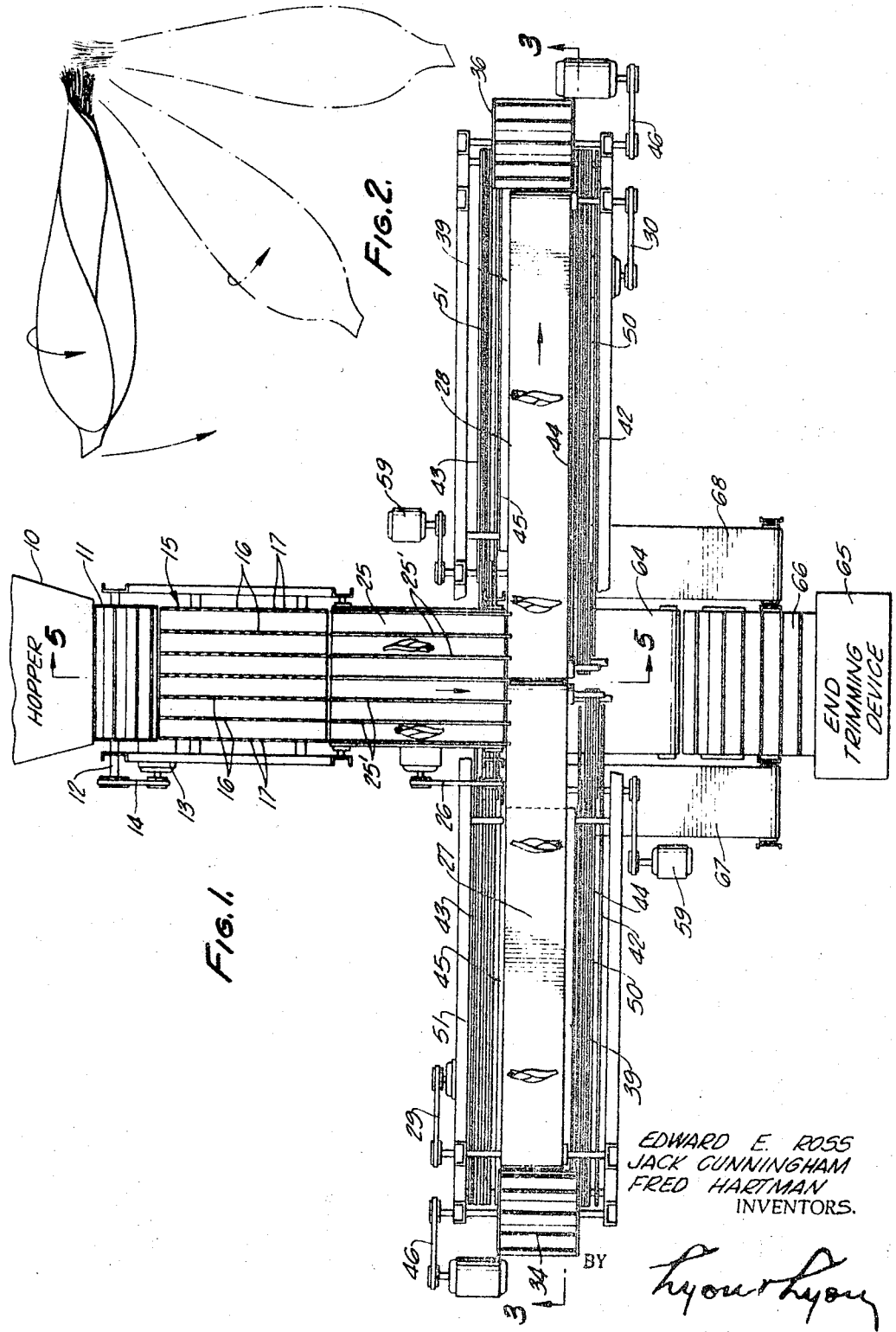

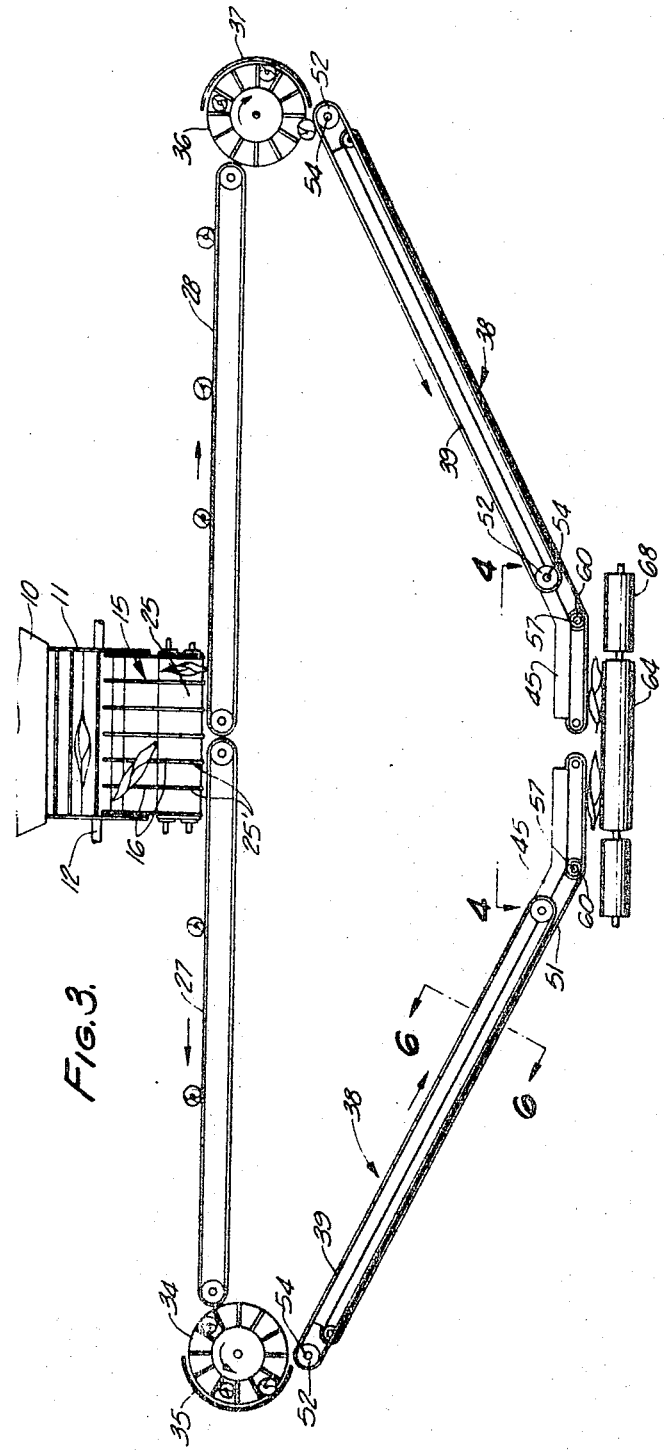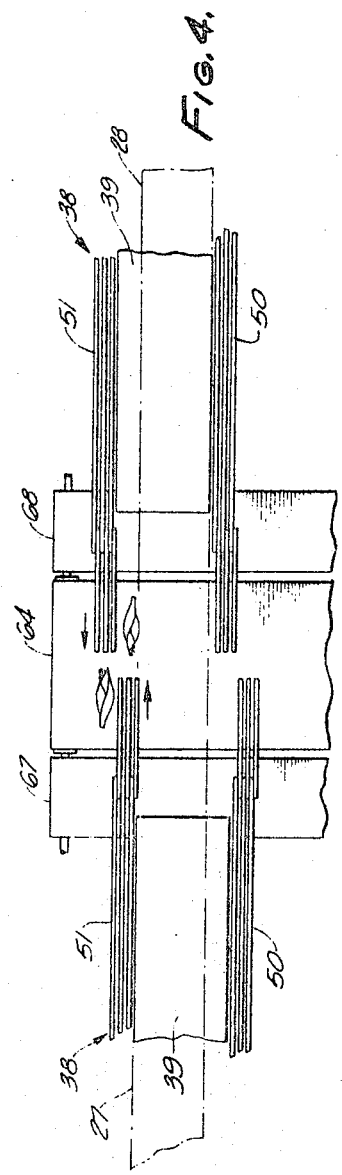

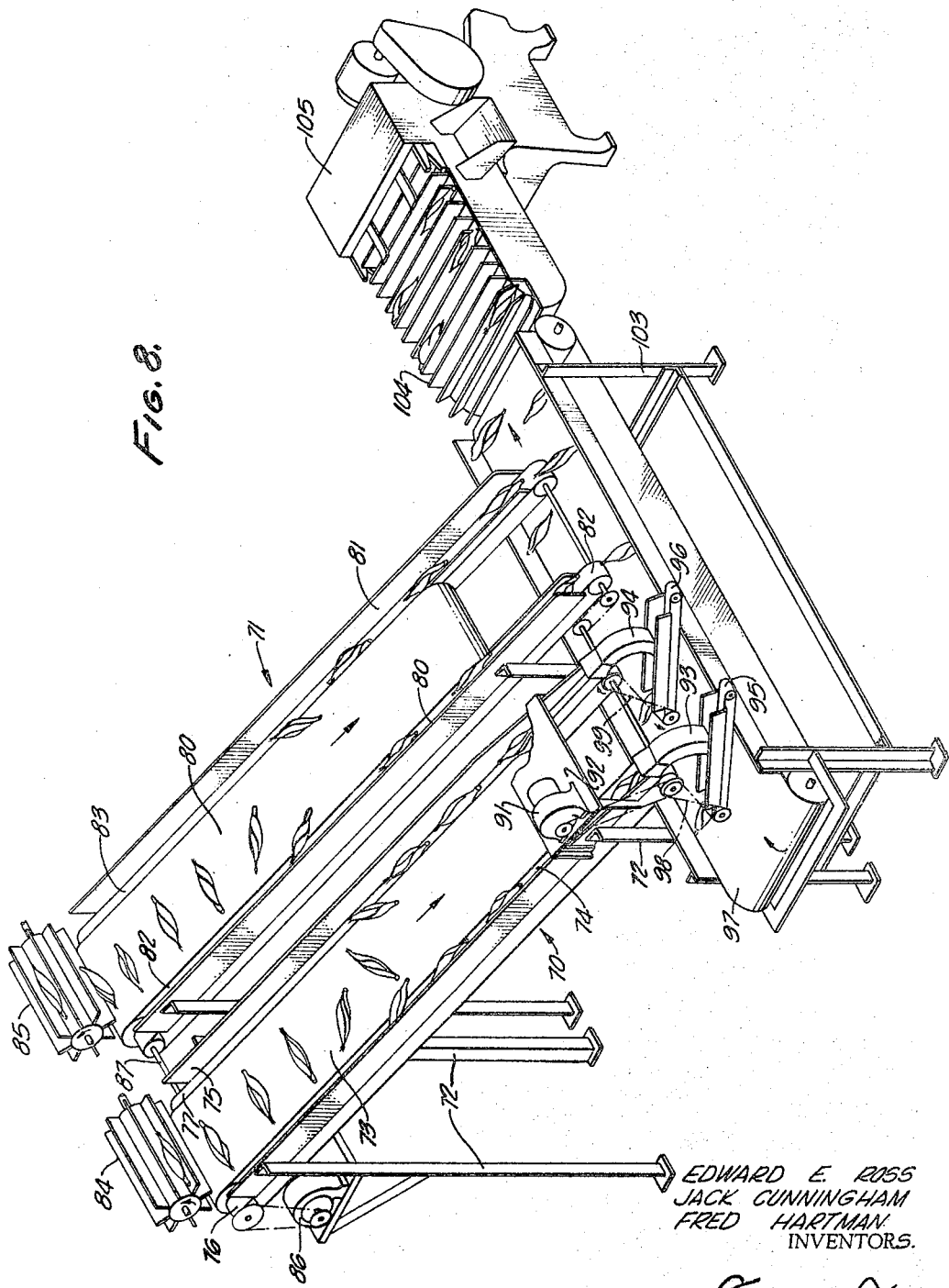

United States Patent Office 3,268,057
Patented August 23, 1966

3,268,057
TAPERED AGRICULTURAL PRODUCT ORIENTING APPARATUS AND METHOD
Edward E. Ross and Jack Cunningham, San Francisco, Calif., and Fred Hartman, Toppenish, Wash., assignors to California Packing Corporation, San Francisco, Calif., a corporation of New York
Filed Sept. 10, 1963, Ser. No. 308,025
9 Claims. (Cl. 198—33)

This invention relates to the processing of agricultural products and more particularly relates to a method and apparatus for orienting tapered agricultural products such as sweet corn, carrots, certain types of squash, parsnips, pears and the like.

In the processing of tapered agricultural products such as corn or carrots for canning or freezing, present day processing machinery requires that the products be aligned with the larger diameter ends of the products oriented in one direction. This orienting is presently done by visual inspection and hand positioning of the products. For example, in the husking of sweet corn, the ears must be oriented and aligned for the butt cutting operation preliminary to husking. The manual orientation of each ear of corn is time consuming and presents a considerable hazard as the operators are required to have their hands in close proximity to moving machinery parts and cutters. Similar problems, of course, exist in other corn processing operations and in the processing of other tapered products.

According to the present invention, a method and apparatus are provided for automatically orienting tapered agricultural products. This automatic orienting is accomplished by rolling the tapered articles down an inclined surface whereby the force of gravity in combination with the difference in circumference of the extremities causes their larger diameter ends to roll faster, the articles thus rolling in an arc toward the side of the inclined surface nearest which the smaller diameter end of the article is located. The articles are permitted to roll over the edges of the surface whereupon they are received or caught by properly dimensioned conveyor belts which carry the articles, large end first, to the next processing stage. The method and apparatus provided eliminate the need for manual orienting of tapered agricultural products and thus considerably speed up the processing cycle and increase the efficiency of the other processing machinery. Elimination of the manual orienting further eliminates a dangerous safety hazard.

It is therefore an object of the present invention to provide a method for orienting tapered agricultural products.

It is also an object of the present invention to provide such a method whereby a plurality of tapered agricultural products can be continuously oriented with their larger diameter ends facing in one direction.

It is another object of the present invention to provide apparatus for automatically orienting tapered agricultural products.

It is a further object of the present invention to provide such a method and apparatus whereby tapered agricultural products are caused to become oriented by rolling down an inclined surface and are then caught and prevented from becoming disoriented.

It is still a further object of the present invention to provide such an apparatus wherein tapered agricultural products are caused to become oriented by rolling down an inclined surface and are then caught and prevented from becoming disoriented and wherein disoriented products, debris, trash, or the like are continuously removed so as not to impede the orienting of later processed products.

These and other objects and advantages of the present invention will become more apparent upon reference to the accompanying description and drawings wherein:

FIGURE 1 is a top plan view of one embodiment of the apparatus of the present invention;
FIGURE 2 illustrates the manner in which an ear of sweet corn will become oriented with its larger diameter end downward when rolled down an inclined surface;
FIGURE 3 is a view taken along lines 3—3 of FIGURE 1;
FIGURE 4 is a view taken along lines 4—4 of FIGURE 3;
FIGURE 5 is a view, partly in section, taken along lines 5—5 of FIGURE 1;
FIGURE 6 is a view, partly in section, taken along lines 6—6 of FIGURE 3;
FIGURE 7 is a perspective view of the discharge end of the oriented product conveyor belt shown in FIGURES 3 and 4; and
FIGURE 8 is a perspective view of a second embodiment of the apparatus of the present invention.

Referring now to FIGURES 1 and 3 through 7, there is shown a first embodiment of the apparatus of the present invention. An open topped hopper 10 is positioned above a pocketed drum 11 which is mounted on a shaft 12 driven by motor 13 and belt and pulley system 14 or any other suitable drive mechanism. The motor 13 is preferably a variable speed motor so that the delivery rate of the objects can be varied as desired.

As the drum 11 turns in a clockwise direction, each of its pockets deposits an object such as an ear of sweet corn on a laned shaker 15. Each of the upstanding walls 16 of the shaker 15 is provided with a plurality of slight projections 17 which cause the ears delivered by the drum to become aligned in the direction of the lanes and fall into the bottom of a lane as the ear travels across the shaker. As can be seen in FIGURE 5, the lanes are slightly inclined and the shaker may be agitated by means of a motor 18 which drives an eccentric 19 by means of a belt 20. The eccentric 19 engages the bottom plate 23 of the shaker 15 which is spring mounted by means of springs 24 and causes the movement of the shaker. The shaker may also be supported by flexible or pivoted arms rather than springs.

Directly in front of and slightly below the shaker 15 is a high speed conveyor belt 25 driven by a suitable driving mechanism 26. The conveyor belt 25 is also laned by means of walls 25' which correspond to the walls 16 of the shaker 15. This conveyor belt 25 receives the ears of corn from the shaker 15 and quickly conveys them to a pair of cross feed belts 27 and 28 which are driven by conventional drive mechanisms 29 and 30.

An indexing feeder 34 is positioned at the outward end of the cross feed belt 27. This feeder is a pocketed drum similar to the drum 11 and serves to receive the ears of corn delivered by the cross feed belt 27. The indexing feeder 34 is driven by any suitable device in a counterclockwise direction and is provided with a cover plate 35 which covers about 180 degrees of the circumference of the feeder and holds the ears in the pockets until they travel around to a point directly beneath the drum. A similar indexing feeder 36 and cover plate 37 are positioned at the outer end of the cross feed belt 28 to receive the ears of corn delivered by this belt.

The feeders 34 and 36 deliver their ears of corn to a pair of identical inclined orientors, indicated generally at 38, which have their upper ends positioned beneath their respective feeders adjacent the end of the cover plates to receive the ears of corn discharged from the feeders. As can best be seen from FIGURE 6, each orientor 38 includes a central endless belt 39 flanked by a pair of gutters 40 and 41 defined by outside walls 42 and 43 and inner walls 44 and 45. The upper portions of the inner walls 45 are sloped inwardly towards the belt 39 to improve the transfer of objects from the belt 39 into the gutters 40 and 41. The belt 39 is driven by a suitable drive mechanism 46.

Positioned in the gutter 40 is a gutter belt 50 which as shown comprises three narrow belts driven simultaneously. This belt could, of course, take any other suitable form such as a single solid belt. A similar gutter belt 51 is positioned in the gutter 41. The belt 39 may be mounted on a plurality of rollers 52 which are provided with bushings 53 which are rotatably mounted on shafts 54 suitably supported by a framework 55. A framework 55 is provided with flanges 56 which serve to mount shafts 57 on which are rotatably mounted rollers 58 for the belts 50 and 51. The belts 50 and 51 are driven by a suitable drive mechanism 59 preferably at a speed greater than that of belt 39.

As can be seen from FIGURES 3 and 4, the gutters 40 and 41 extend beyond the terminating point of the central belts 39. Shortly after the terminating point of the central belt 39, the gutters and gutter belt change from an inclined position to a horizontal position. A typical manner in which this change of direction is made using a single pulley 60 is illustrated in FIGURE 7. If a single solid gutter belt was used in place of the plurality of belts illustrated, a double pulley arrangement would be necessary for this directional change.

Positioned beneath the ends of the gutters 40 and 41 of the orientors 38 is a feed belt 64 which receives the ears carried by the gutter belts 50 and 51 and directs them to the end trimming device 65 by means of the flights 66. As can best be seen from FIGURE 4, the gutter belts 50 and 51 of each of the orientors 38 are offset so that the ears discharged by each of them on to the feed belt 64 will not interfere with the other. Since the ears delivered by each gutter belt are discharged butt end first, the feed belt 64 carries two lines of ears, all of the ears of each line being oriented in the same direction with their butt ends towards the respective set of knife blades in the end trimming device 65.

Located on either side of the feed belt 64 and positioned beneath the terminaitng points of the belts 39 are trash removing belts 67 and 68. If for some reason the ears supplied to the belts 39 will not roll, or if some extraneous matter such as stalks or other debris should appear on the belt 39, they will be carried over the end of the belt and deposited on the trash removal belts 67 and 68, thus preventing any interference with ears later discharged on to the belt 39.

The operation of the apparatus just described is readily apparent. The ears of corn are fed into the open topped hopper 10 until it is full. The pocketed drum 11, rotating at the desired speed, will lift a specified number of ears from the hopper 10 as each pocket comes in contact with the corn in the hopper. The remaining corn in the hopper will slide into the void space created, ready for pickup by the next pocket. The rotating drum 11 will carry the corn around and drop it onto the laned inclined shaker 15 in controlled amounts. In traveling across the top of the lanes, each ear will come into contact with the slight projections 17 which will cause the ear to become aligned in the direction of the lanes and fall into the bottom of a lane as the ear travels across the shaker.

As they reach the end of the shaker, the ears will fall onto the laned accelerator belt 25 which keeps them aligned and increases their speed preparatory to transfer to the cross feed belts 27 and 28. The belt 25 projects the ears onto the belt 27 and 28 at such a speed that they will keep their alignment during the transfer. The ears are now traveling on the two cross feed belts and are aligned parallel to each other but are not butt end oriented. They are fed from the belts 27 and 28 into the indexing feeders 34 and 36 which pick the ears up one at a time from the belts 27 and 28 at spaced intervals, carry them over the top of the feeders and down the opposite side as the drums rotate to a point directly underneath the drum. At this point the ears reach the end of the cover plates, fall out of the pocket and onto the top of the central belt 39 of the orientors 38.

When the ear is discharged onto the belt 39 it begins to roll under the force of gravity. As it rolls down the belt 39, the larger diameter end rolls faster than the smaller diameter end causing the ear to roll in an arc toward either side of the belt as illustrated in FIGURE 2. The width of the belt relative to the length of the product being processed is made such that the product will roll off the side of the belt when it has rolled to a position wherein it is generally in alignment with the longitudinal dimension of the belt with its larger diameter or butt end downward. A suitable angle of incline for the orienting belt or plane has been found to be 22° with the horizontal plane.

After rolling off the side of the belt 39, the ears are deposited in one of the gutters 40 or 41 and the gutter belt 50 and 51 carry them, larger diameter end first, to the end of the gutters. After the gutter belts 50 and 51 change to the horizontal direction, the ears are transferred to the feed belt 64 in the staggered position illustrated by FIGURES 1 and 4. After this transfer, the ears are transported to the flights 66 and thence to the end trimming device 65 with their butt ends oriented towards the knife blades of the device 65. Any ears that did not become properly oriented or any trash or debris appearing on the belts 39 are removed by belts 67 and 68.

Referring now to FIGURE 8, there is shown another embodiment of the apparatus of the present invention. In this figure, a pair of orientors 70 and 71 are maintained in an inclined position by means of a suitable framework 72. The orientor 70 has a central belt 73, gutters 74 and 75 flanking the main belt 73, and gutter belts 76 and 77 positioned in the gutters 74 and 75.

Similarly, the orientor 71 has a central belt 80, gutters 80 and 81, and gutter belts 82 and 83. At the upper end of the orientors 70 and 71 there are provided a pair of pocketed drums 84 and 85 which feed ears of sweet corn or other tapered agricultural products to the orientors 70 and 71. The framework 72 supports a suitable motor 86 for driving the main belts 73 and 80 through a shaft 87 on which are mounted a plurality of idler pulleys for the gutter belts 76, 77, 82 and 83. These latter belts are driven at a higher speed than the belts 73 and 80 by a motor 91 mounted on a platform 92 supported by the framework of the orientor 70.

At the end of the gutters 74 and 75 of the orientor 70 there are provided a pair of chutes 93 and 94 and belts 95 and 96 which serve to turn the ears around before discharging them onto a feed belt 97. The belts 95 and 96 are driven by the motor 91 through suitable couplings 98 and 99.

The gutter belts 82 and 83 of the orientor 71 discharged directly onto the feed belt 97 and the ears discharged from each orientor are thus aligned in parallel rows, with the ears in each row having their larger diameter ends oriented in the same direction. The feed belt 97 is mounted on a suitable framework or table 103 and feeds the flights 104 of an end trimming device 105. The trimming device 105 is provided with a pair of cutters which trim the butt ends of the ears of each row.

From the foregoing description, it can be seen that a method and apparatus have been provided which permit the automatic orientation of a plurality of tapered agricultural products, examples of which are corn and carrots. The invention thus enables the downstream processing machinery to operate at a higher efficiency as the initial feeding speed of the products is greatly increased. The invention also permits the elimination of a dangerous manual operation. It is to be understood that the present invention, although generally illustrated and described in connection with unhusked ears of sweet corn, is equally useful with any agricultural product which is shaped such that one end will roll faster than the other end of the product. It should also be understood that the length of the various belts and their widths will depend on the length and the amount of taper of the particular agricultural products being processed and need only be dimensioned in accordance with the principles hereinbefore discussed.

The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of orienting tapered agricultural products with their larger diameter ends in the same direction, comprising:
   placing said products at the top of an inclined endless belt in a position generally perpendicular to the longitudinal dimension of said belt;
   sequentially releasing said products whereby each of said products rolls down said belt in an arcuate manner until it is aligned generally parallel with said longitudinal dimension with its larger diameter end downward;
   removing said products from the sides of said belt after they have rolled to said aligned position but before they reach the lower end of said belt while maintaining said products in their larger diameter end oriented position;
   moving said belt downwardly in the direction of its longitudinal dimension sumultaneously with the releasing of said products to discharge from the lower end of the belt any debris, trash or products not previously removed from the sides thereof; and
   separately transporting the larger diameter end oriented products and the discharged material away from said belt.

2. Apparatus for orienting tapered agricultural products with their larger diameter ends in the same direction, comprising:
   a framework;
   a first endless belt supported by said framework and inclined away from the horizontal plane, the direction of movement of said belt being in the downward direction;
   second and third endless belts mounted on either side of said first belt and having portions thereof inclined at the same angle as said first belt; and
   means for delivering said products to said first belt and releasing them thereon whereby each of said products rolls down said first belt in an arcuate manner, said second and third belts receiving the products that roll off the side of said first belt.

3. Apparatus for orienting tapered agricultural products with their larger diameter ends in the same direction, comprising:
   a framework;
   a first endless belt supported by said framework and inclined away from the horizontal plane, the direction of movement of said belt being in the downward direction;
   second and third endless belts mounted on either side of said first belt and having portions thereof inclined at the same angle and moving in the same direction as said first belt;
   an indexed feeder for individually delivering said products to said first belt and releasing them thereon whereby each of said products rolls down said first belt in an arcuate manner, said second and third belts receiving the products that roll off the side of said first belt; and a fourth endless belt positioned adjacent the ends of said second and third belt for receiving the products discharged therefrom.

4. Apparatus for orienting tapered agricultural products with their larger diameter ends in the same direction, comprising:
   an inclined endless belt moving in the direction of incline;
   means for delivering said products to said belt and releasing them thereon in a position generally perpendicular to the longitudinal dimension of said belt whereby each of said products rolls down said belt in an arcuate manner;
   said belt having a lateral dimension relative to the length of said products such that when said products have rolled to a position in which they are generally parallel to said longitudinal dimension with their larger diameter ends downward they will roll off the side of said belt;
   a gutter positioned on each side of said belt for receiving the products that fall off the sides of said belt; and
   a moving belt positioned in each gutter for carrying away the products that are received therein while maintaining them in their larger diameter end oriented position.

5. Apparatus for orienting tapered agricultural products with their larger diameter ends in the same direction, comprising:
   means for longitudinally aligning said products;
   means for supplying said products to said longitudinally aligning means;
   means for receiving the longitudinally aligned products from said aligning means;
   an inclined endless belt moving in the direction of incline;
   means for individually transferring said products from said receiving means to the top of said belt and releasing them thereon whereby each of said products rolls down said belt in an arcuate manner;
   said belt being so constructed and arranged that said products will roll off the edge of said belt when they have rolled to a position in which they are generally parallel to the longitudinal dimension of the belt with their larger diameter ends downward.

6. Apparatus for orienting tapered agricultural products with their larger diameter ends in the same direction, comprising:
   means for longitudinally aligning said products;
   means for supplying said products to said longitudinally aligning means;
   belt means for receiving the longitudinally aligned products from said aligning means;
   a moving belt positioned at an angle with the horizontal;
   indexing means for individually transferring said products from said receiving belt means to the top of said moving belt and releasing them on said belt in a position generally perpendicular to the longitudinal dimension of said belt whereby each of said products rolls down said belt in an arcuate manner; and
   a gutter positioned on each side of said moving belt for receiving products that fall off the sides of said belt as a result of their arcuate rolling movement.

7. Apparatus for orienting tapered agricultural products with their larger diameter ends in the same direction, comprising:
   means for longitudinally aligning said products;
   means for supplying said products to said longitudinally aligning means;
   an endless belt for receiving the longitudinally aligned products from said aligning means;
   a second endless belt positioned below said receiving belt and supported at an angle with the horizontal;
   indexing means for individually transferring said products from said receiving belt to the top of said second belt and releasing them on said second belt in a position generally perpendicular to the longitudinal dimension of said belt whereby each of said products rolls down said belt in an arcuate manner;
a gutter positioned on each side of said second belt for receiving products that fall off the side of said belt as a result of their arcuate rolling movement;
a moving belt positioned in each of said gutters for carrying away the products that are received therein; and
a feed belt for receiving the products discharged by the moving belt in said gutters.

8. Apparatus for orienting tapered agricultural products with their larger diameter ends in the same direction, comprising:
a laned shaker for longitudinally aligning said products;
means for supplying said products to said laned shaker;
accelerating belt means for receiving the longitudinally aligned products from said shaker;
first and second endless belts for receiving the products discharged from said accelerating belt, said first and second belts moving in opposite directions;
third and fourth endless belts positioned below said first and second endless belts respectively and supported at an angle with the horizontal;
first indexing means for individually transferring said products from said first belt to the top of said third belt and releasing them on said third belt in a position generally perpendicular to the longitudinal dimension of said third belt whereby each of said products rolls down said belt in an arcuate manner;
second indexing means for individually transferring said products from said second belt to the top of said fourth belt and releasing them on said fourth belt in a position generally perpendicular to the longitudinal dimension of said fourth belt whereby each of said products rolls down said belt in an arcuate manner;
a gutter positioned on each side of each of said third and fourth belts for receiving products that fall off the sides of said belts as a result of their arcuate rolling movement;
a fifth belt for receiving the products discharged by said gutter belts; and
sixth and seventh belts positioned below the ends of said third and fourth belts for receiving any material remaining on said belts.

9. Apparatus for orienting tapered agricultural products with their larger diameter ends in the same direction, comprising:
first and second endless belts supported at an angle from the horizontal;
means for individually delivering said products to the top of said belts in a position generally perpendicular to the longitudinal dimension of said belts and releasing them on said belts in a position generally perpendicular to the longitudinal dimenson of said belts whereby each of said products rolls down said belt in an arcuate manner;
a gutter positioned on each side of each of said belts for receiving products that fall off the sides of said belts as a result of their arcuate rolling movement;
a moving belt positioned in each gutter for carrying away the products that are received therein;
a feed belt for receiving the products discharged by said gutter belts; and
means for reversing the orientation of said products as they are transferred from said first belt to said feed belt whereby two lines of products are formed on said feed belt, the larger diameter ends of the products in one line being oriented in the opposite direction than the larger diameter ends of the products in the other line.

References Cited by the Examiner

UNITED STATES PATENTS

| 101,829 | 4/1870 | Crosby | 193—43 |
| 1,058,116 | 4/1913 | Thompson | 146—86 |
| 1,416,687 | 5/1922 | Butler | 193—43 |
| 2,337,394 | 12/1943 | Kok | 198—33.3 |
| 2,738,867 | 4/1956 | Skillman | 198—79 X |
| 2,969,866 | 1/1961 | Musgrave | 198—29 |

FOREIGN PATENTS

| 1,151,432 | 1/1958 | France. |
| 742,874 | 1/1956 | Great Britain. |

EVON C. BLUNK, *Primary Examiner.*

SAMUEL F. COLEMAN, *Examiner.*

R. J. HICKEY, *Assistant Examiner.*